US009744912B1

(12) United States Patent
Nobert

(10) Patent No.: US 9,744,912 B1
(45) Date of Patent: Aug. 29, 2017

(54) VEHICLE EXTERNAL DEVICE ATTACHMENT SYSTEM

(71) Applicant: Nobert IRA Investments, LLC, Marana, AZ (US)

(72) Inventor: Lorraine Nobert, Marana, AZ (US)

(73) Assignee: Nobert IRA Investments, LLC, Marana, AZ (US)

( * ) Notice: Subject to any disclaimer, the term of this patent is extended or adjusted under 35 U.S.C. 154(b) by 0 days.

(21) Appl. No.: 15/130,577

(22) Filed: Apr. 15, 2016

(51) Int. Cl.
B60R 9/06 (2006.01)
B60R 9/08 (2006.01)
B60R 11/00 (2006.01)

(52) U.S. Cl.
CPC .............. B60R 11/00 (2013.01); B60R 9/06 (2013.01); B60R 9/08 (2013.01); B60R 2011/004 (2013.01); B60R 2011/005 (2013.01); B60R 2011/0052 (2013.01); B60R 2011/0075 (2013.01); B60R 2011/0078 (2013.01); B60R 2011/0082 (2013.01); B60R 2011/0084 (2013.01); B60R 2011/0085 (2013.01)

(58) Field of Classification Search
CPC ..... B60R 9/06; B60R 9/08; B60R 2011/0052; B60R 2011/0078; B60R 2011/0084; B60R 2011/0085
USPC ....... 224/274, 406, 488, 525, 531, 545, 551, 224/557, 565; D12/16
See application file for complete search history.

(56) References Cited

U.S. PATENT DOCUMENTS

| 3,304,035 | A | * | 2/1967 | Davis | A45B 11/00 135/20.1 |
| 3,304,036 | A | * | 2/1967 | Davis | A45B 11/00 248/229.14 |
| 4,337,882 | A | * | 7/1982 | Hampton | A63B 55/60 211/70.2 |
| 4,630,990 | A | * | 12/1986 | Whiting | B60R 9/042 224/310 |
| 4,876,980 | A | * | 10/1989 | Bell, III | A01K 97/10 114/255 |
| 4,937,965 | A | * | 7/1990 | Narvaez | F41A 23/02 42/94 |
| 5,088,673 | A | * | 2/1992 | Chandler | B60N 3/103 215/386 |
| 5,427,286 | A | * | 6/1995 | Hagerty | B60R 9/00 211/18 |
| 5,657,957 | A | * | 8/1997 | Graham | A45B 11/00 224/274 |
| 5,755,418 | A | * | 5/1998 | Kracke | B67D 3/0029 211/74 |
| 5,800,294 | A | * | 9/1998 | Naecker, Jr. | A63B 63/083 211/13.1 |
| 5,941,488 | A | * | 8/1999 | Rosen | B60R 11/0235 224/551 |
| 6,478,203 | B2 | * | 11/2002 | Burns | B60R 9/065 206/315.3 |
| 6,516,986 | B1 | * | 2/2003 | Lassanske | B60R 9/048 224/502 |

(Continued)

Primary Examiner — Justin Larson

(57) ABSTRACT

A vehicle external device attachment system that allows users to attach devices such as heaters or fans to their uncovered vehicles. An example of such a vehicle is a golf cart. The height of the attached device is adjustable via an adaptor ring. The vehicle external device attachment system provides stability to the external devices unprecedented in existing systems.

11 Claims, 4 Drawing Sheets

(56) References Cited

U.S. PATENT DOCUMENTS

| | | | | |
|---|---|---|---|---|
| 6,871,440 B2* | 3/2005 | Highfill | ............... | F41J 9/18 |
| | | | | 42/90 |
| 7,066,365 B2* | 6/2006 | Brown | ............... | B60R 9/06 |
| | | | | 224/401 |
| 7,284,586 B2* | 10/2007 | Howland | ............ | B60C 25/16 |
| | | | | 157/14 |
| 8,640,377 B2* | 2/2014 | Baltes | ............... | A01K 97/10 |
| | | | | 114/364 |
| 8,850,950 B2* | 10/2014 | Deckard | ............ | B64D 7/06 |
| | | | | 89/136 |
| 2003/0205600 A1* | 11/2003 | Couto | ............... | B60P 3/075 |
| | | | | 224/548 |
| 2006/0261234 A1* | 11/2006 | Taboada | ............ | B60N 3/103 |
| | | | | 248/314 |
| 2006/0277813 A1* | 12/2006 | Saldana | ........... | A47G 23/0241 |
| | | | | 43/21.2 |
| 2011/0139844 A1* | 6/2011 | Sautter | ............... | B60R 9/06 |
| | | | | 224/488 |
| 2011/0147425 A1* | 6/2011 | Di Miceli | ........... | B60R 11/00 |
| | | | | 224/547 |

* cited by examiner

VEHICLE EXTERNAL DEVICE ATTACHMENT SYSTEM

BACKGROUND OF THE INVENTION

Harsh weather conditions make driving a golf cart unenjoyable. Although propane heaters and electric fans tailored for golf carts do exist, they typically only fit in the golf cart cup holders. Inevitably, this takes away from the number of cup holders available for beverages. This also prevents users from easily adjusting the propane heaters and electric fans to a desired height. Furthermore, when such cup holders are installed at the ends of the golf cart dash, the propane heaters and electric fans hinder users from entering and exiting the golf cart.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

DESCRIPTION OF PREFERRED EMBODIMENTS

The present invention is a vehicle external device attachment system (100) onto which an external device (600) can be attached. The vehicle external device attachment system (100) is easily adjustable to the desired height and saves any existing space within a vehicle (500) (for example, space of cup holders and space to enter and exit the vehicle (500)) from being used. In some embodiments, the vehicle (500) is a golf cart.

Figure 1:
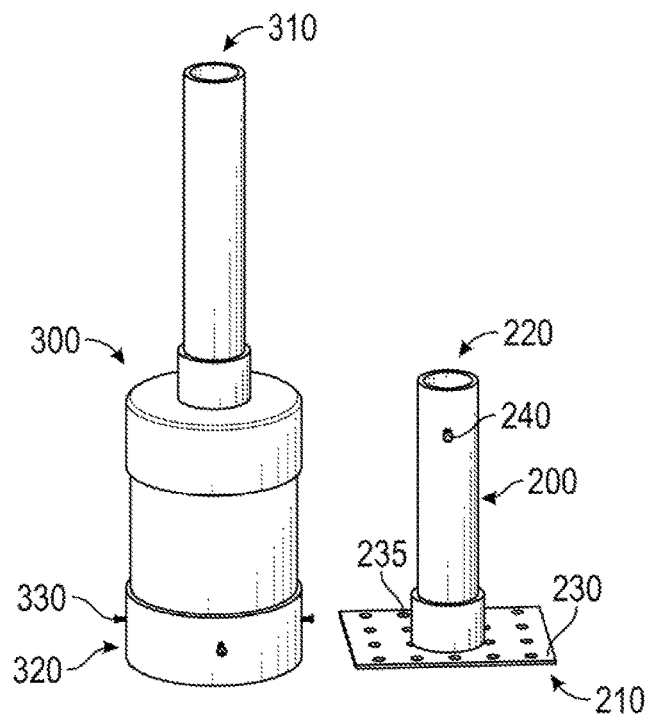
FIG. 1 shows the base cylinder (200) and the main cylinder (300).

Referring now to FIG. 1, the vehicle external device attachment system (100) comprising a hollow base cylinder (200) is shown. The base cylinder (200) has a base cylinder first end (210) and a base cylinder second end (220). In some embodiments, a base cylinder plate (230) is disposed on the base cylinder first end (210). In some embodiments, a plurality of base cylinder plate attachment holes (235) are disposed on the base cylinder plate (230). In some embodiments, a base cylinder insert (240) is partially disposed closer to the base cylinder second end (220) and through the surface of the base cylinder (200) in the diametric direction. In some embodiments, the base cylinder insert (240) is a screw.

Referring again to FIG. 1, the vehicle external device attachment system (100) comprising a hollow main cylinder (300) is shown. The main cylinder (300) has a main cylinder first end (310) and a main cylinder second end (320). In some embodiments, the main cylinder first end (310) diameter is smaller than the main cylinder second end (320) diameter and the base cylinder (200) diameter. This allows the main cylinder first end (310) to insert through the base cylinder second end (220). In some embodiments, the main cylinder second end (320) diameter is bigger than the base cylinder (200) diameter. This prevents the entire main cylinder (300) from sliding through the base cylinder (200).

In some embodiments, a main cylinder insert (330) is partially disposed closer to the main cylinder second end (310) and through the surface of the main cylinder (300) in the diametric direction. In some embodiments, the main cylinder insert (330) is a screw. In some embodiments, a main cylinder bracket (340) is disposed closer to the main cylinder second end (320) and on the surface of the main cylinder (300). In some embodiments, a plurality of main cylinder bracket attachment holes (345) are disposed on the main cylinder bracket (340).

In a non-limiting example, the assembly of the vehicle external device attachment system (100) is as follows: the base cylinder plate (230) attaches to a vehicle floor (510) via the plurality of base cylinder plate attachment holes (235) with fasteners including but not limited to screws, bolts, or rivets. In some embodiments, the base cylinder plate (230) is attached to the center of the vehicle floor (510). The plurality of base cylinder plate attachment holes (235) allow installation flexibility, as fasteners can be disposed wherever most appropriate to adequately secure the base cylinder plate (230).

Continuing with the non-limiting example, the main cylinder first end (310) then inserts through the base cylinder second end (220). The main cylinder first end (310) is secured to the base cylinder second end (220) by tightening the base cylinder insert (240) against the surface of the main cylinder (300). The main cylinder (300) is secured to a vehicle front (520) via the plurality of main cylinder bracket attachment holes (345) with fasteners including but not limited to screws, bolts, or rivets. In some embodiments, the vehicle front (520) is the vehicle dash. The plurality of main cylinder bracket attachment holes (345) allow installation flexibility, as fasteners can be disposed wherever most appropriate to adequately secure the main cylinder (300).

Figure 7:
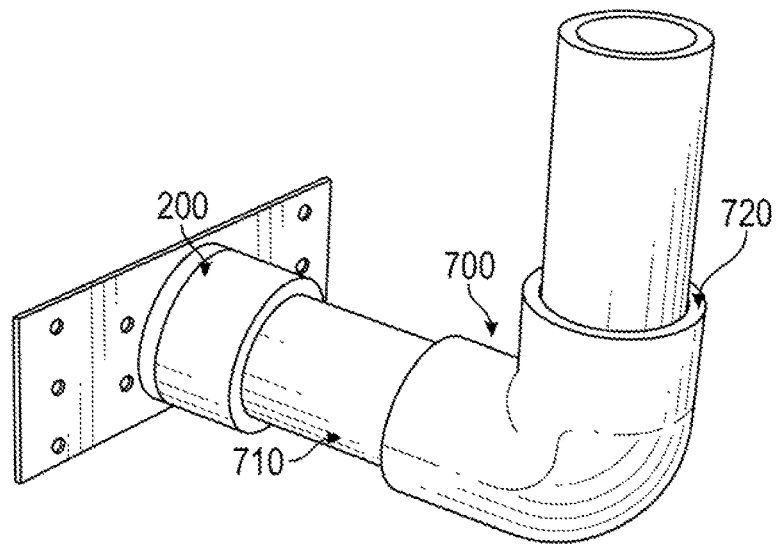
FIG. 7 shows the vehicle external device attachment system (100) with the elbow cylinder (700) configuration.
Figure 8:
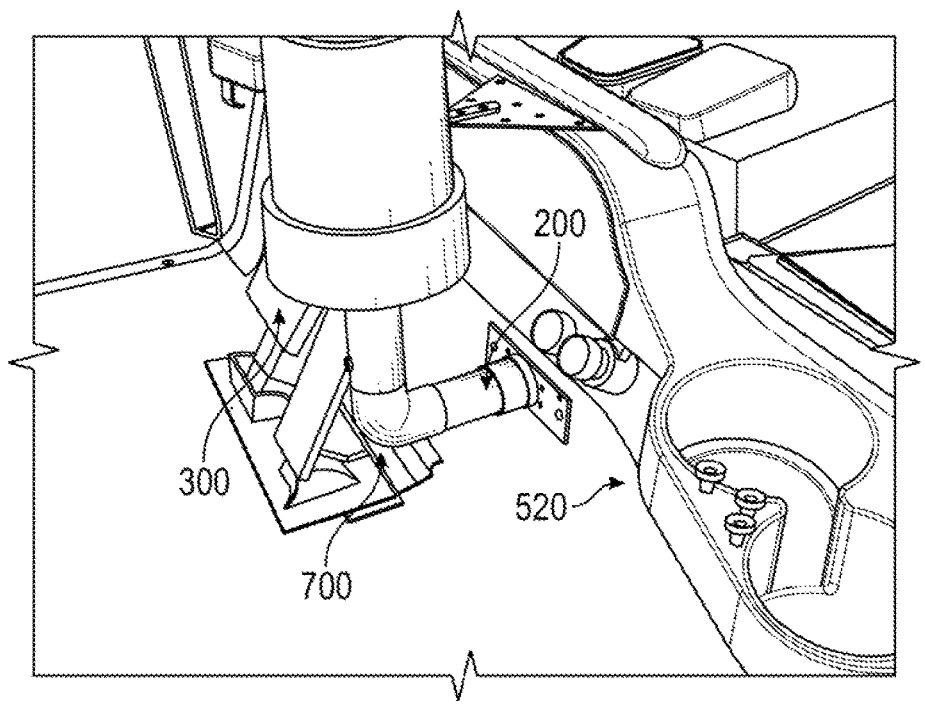
FIG. 8 shows the vehicle external device attachment system (100) with the elbow cylinder (700) configuration installed in a vehicle (500).

In some embodiments, as an option, an elbow cylinder (700) having an elbow cylinder first end (710) and an elbow second end (720) is used to connect the main cylinder (300) and the base cylinder (200). Referring to FIG. 7, the elbow cylinder (700) connected to the base cylinder (200) is shown. That is to say, the base cylinder plate (230) attaches to the vehicle front (520) via the plurality of base cylinder plate attachment holes (235). The base cylinder second end (220) inserts through the elbow cylinder first end (710) and the main cylinder first end (310) inserts through the elbow cylinder second end (720). The main cylinder first end (310) is secured to the elbow cylinder second end (720) via compression fit and the base cylinder second end (220) is secured to the elbow cylinder first end (710) also via compression fit. The main cylinder (300) is then secured to the vehicle front (520) via the plurality of main cylinder bracket attachment holes (345). Referring to FIG. 8, the base cylinder (200) and the main cylinder (300) both attached to the vehicle front (520) is shown.

Figure 2:
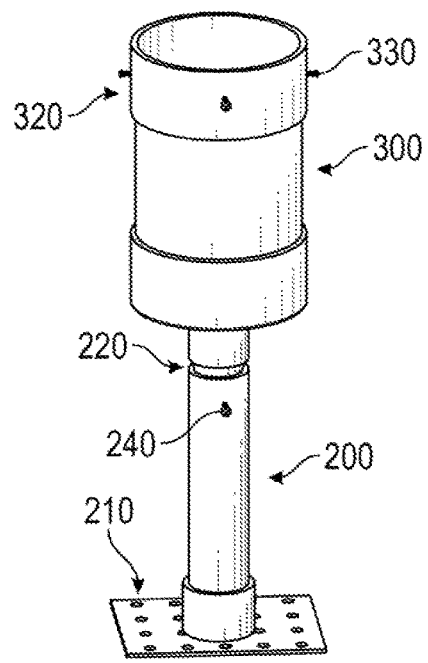
FIG. 2 shows the assembly of the base cylinder (200) and the main cylinder (300).
Figure 3:
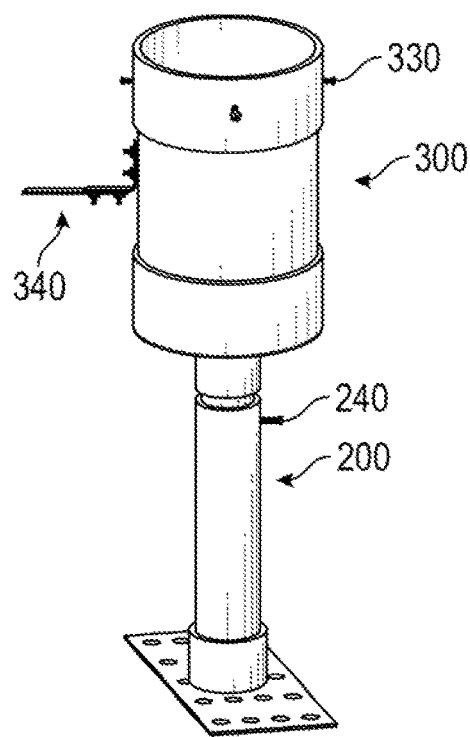
FIG. 3 shows the assembly of the base cylinder (200) and the main cylinder (300) with the main cylinder bracket (340) in view.
Figure 5:
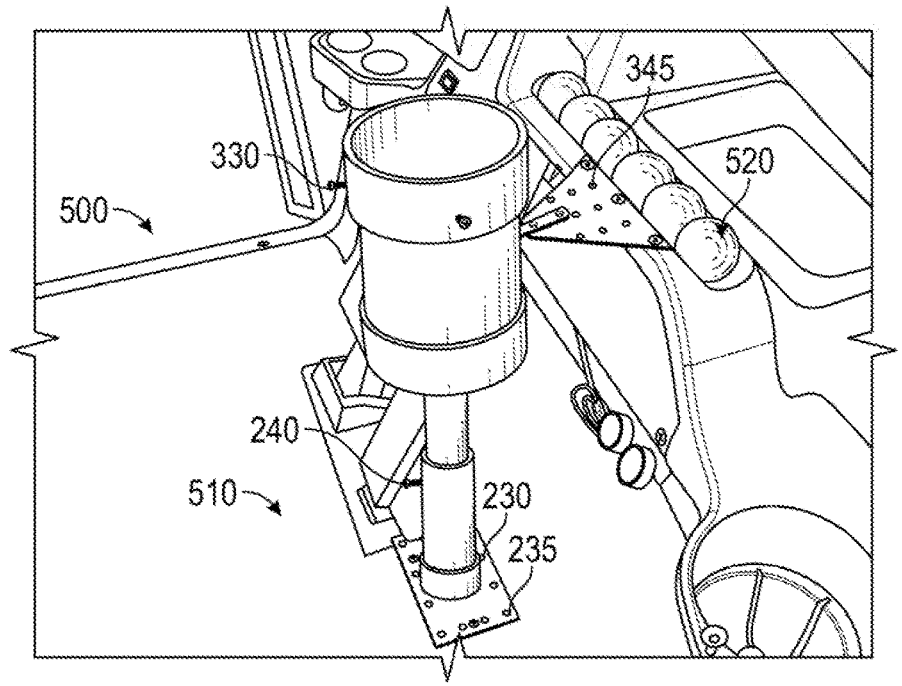
FIG. 5 shows the vehicle external device attachment system (100) installed in a vehicle (500).

Referring to FIG. 2, the assembly of just the base cylinder (200) and the main cylinder (300) is shown. Referring to FIG. 3, the assembly of just the base cylinder (200) and the main cylinder (300) with the main cylinder bracket (400) in view is shown. Referring to FIG. 5, the assembly of the vehicle external device attachment system (100) is shown. Without wishing to limit the present invention to any theory or mechanism, it is believed that mounting the vehicle external device attachment system (100) at two locations (the vehicle floor (510) and the vehicle front (520) or, if using the elbow cylinder (700) option, the vehicle front (520) twice) provides stability to the vehicle external device attachment system (100) unprecedented in existing systems.

Figure 4:
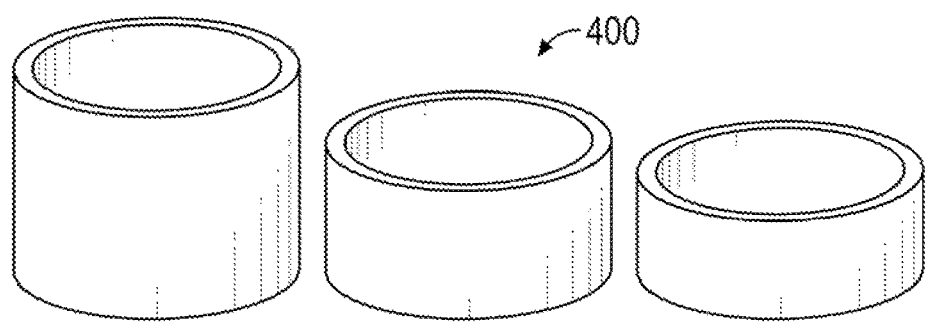
FIG. 4 shows different-sized adaptor rings (400).
Figure 6:
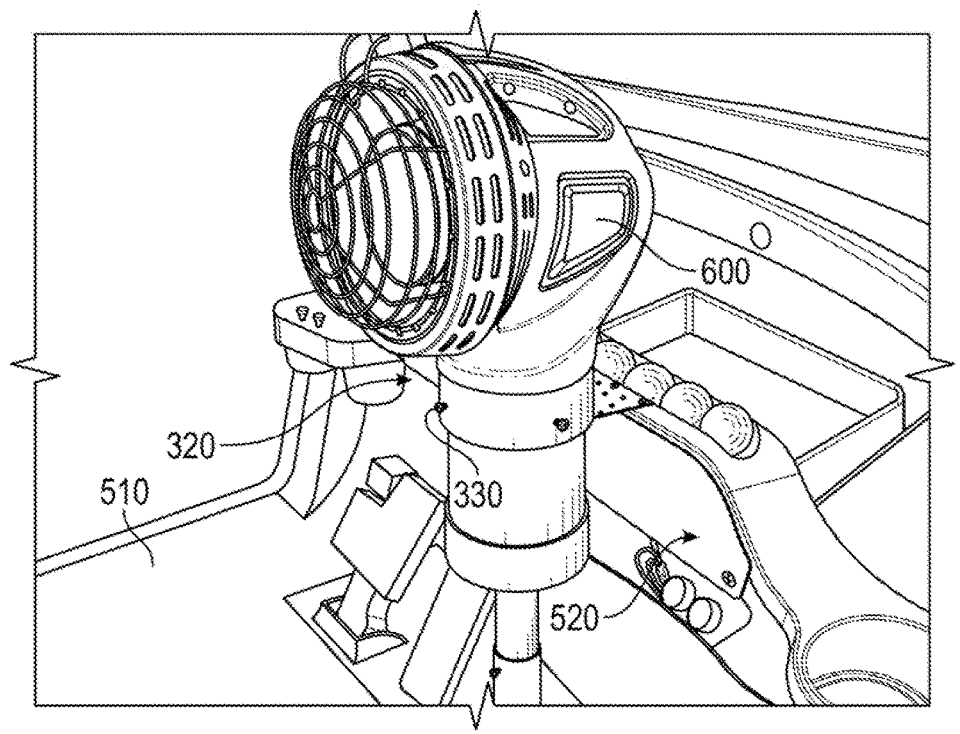
FIG. 6 shows the vehicle external device attachment system (100) installed in a vehicle (500) with an external device (600) attached.

Referring to FIG. 4, examples of an adaptor ring (400) having a bigger diameter than the main cylinder first end (310) is shown. The adaptor ring (400) inserts through the main cylinder second end (320), followed by an external device (600) inserting through the main cylinder second end (320). The external device includes but is not limited to a propane heater or an electrical fan. The external device (600) thus rests on the adaptor ring (400). The height of the external device (600) is adjusted by the adaptor ring (400) by adjusting the size of the adaptor ring (400). Finally, the external device (600) is secured to the main cylinder (300) by tightening the main cylinder insert (330) against the surface of the external device (600). Referring to FIG. 6, an example of an external device (600) attached to the vehicle external device attachment system (100) is shown.

As used herein, the term "about" refers to plus or minus 10% of the referenced number.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims. Reference numbers recited in the claims are exemplary and for ease of review by the patent office only, and are not limiting in any way. In some embodiments, the figures presented in this patent application are drawn to scale, including the angles, ratios of dimensions, etc. In some embodiments, the figures are representative only and the claims are not limited by the dimensions of the figures. In some embodiments, descriptions of the inventions described herein using the phrase "comprising" includes embodiments that could be described as "consisting of", and as such the written description requirement for claiming one or more embodiments of the present invention using the phrase "consisting of" is met.

The reference numbers recited in the below claims are solely for ease of examination of this patent application, and are exemplary, and are not intended in any way to limit the scope of the claims to the particular features having the corresponding reference numbers in the drawings.

What is claimed is:

1. A vehicle external device attachment system (100), comprising:
    a hollow base cylinder (200) having a base cylinder first end (210), a base cylinder second end (220), a base cylinder plate (230) disposed on the base cylinder first end (210), wherein a plurality of base cylinder plate attachment holes (235) are disposed on the base cylinder plate (230), and a base cylinder insert (240) partially disposed closer to the base cylinder second end (220) and through the surface of the base cylinder (200) in the diametric direction,
    a hollow main cylinder (300) having a main cylinder first end (310) and a main cylinder second end (320), wherein the main cylinder first end (310) diameter is smaller than the main cylinder second end (320) diameter and the base cylinder (200) diameter, wherein the main cylinder second end (320) diameter is bigger than the base cylinder (200) diameter, a main cylinder insert (330) partially disposed closer to the main cylinder second end (310) and through the surface of the main cylinder (300) in the diametric direction, a main cylinder bracket (340) disposed closer to the main cylinder second end (320) and on the surface of the main cylinder (300), wherein a plurality of main cylinder bracket attachment holes (345) are disposed on the main cylinder bracket (340),
    wherein the base cylinder plate (230) attaches to a vehicle floor (510) via the plurality of base cylinder plate attachment holes (235), the main cylinder first end (310) inserts through the base cylinder second end (220), the main cylinder first end (310) is secured to the base cylinder second end (220) by the base cylinder insert (240), the main cylinder (300) is secured to a vehicle front (520) via the plurality of main cylinder bracket attachment holes (345), an adaptor ring (400) having a bigger diameter than the main cylinder first end (310) inserts through the main cylinder second end (320), and an external device (600) inserts through the main cylinder second end (320), wherein the external device (600) rests on the adaptor ring (400) and the main cylinder insert (330) secures the external device (600) to the main cylinder (300),
    wherein the height of the external device (600) is adjustable via the adaptor ring (400).

2. The system (100) of claim 1, wherein an elbow cylinder (700) having an elbow cylinder first end (710) and an elbow second end (720) is used to connect the base cylinder second end (220) and the main cylinder first end (310).

3. The system (100) of claim 2, wherein the base cylinder second end (220) inserts through the elbow cylinder first end (710), wherein each component is secured to each other via compression fit.

4. The system (100) of claim 2, wherein the main cylinder first end (310) inserts through the elbow cylinder second end (720), wherein each component is secured to each other via compression fit.

5. The system (100) of claim 1, wherein the elbow cylinder (700) is 90 degrees.

6. The system (100) of claim 1, wherein the base cylinder plate (230) also attaches to the vehicle front (520).

7. The system (100) of claim 1, wherein a vehicle (500) comprises the vehicle floor (510) and the vehicle front (520).

8. The system (100) of claim 6, wherein the vehicle (500) is a golf cart.

9. The system (100) of claim 1, wherein the external device (600) is a propane heater.

10. The system (100) of claim 1, wherein the external device (600) is an electric fan.

11. A vehicle external device attachment system (100), comprising:

a hollow base cylinder (200) having a base cylinder first end (210), a base cylinder second end (220), a base cylinder plate (230) disposed on the base cylinder first end (210), wherein a plurality of base cylinder plate attachment holes (235) are disposed on the base cylinder plate (230), and a base cylinder insert (240) partially disposed closer to the base cylinder second end (220) and through the surface of the base cylinder (200) in the diametric direction, a hollow main cylinder (300) having a main cylinder first end (310) and a main cylinder second end (320), a main cylinder insert (330) partially disposed closer to the main cylinder second end (310) and through the surface of the main cylinder (300) in the diametric direction, a main cylinder bracket (340) disposed closer to the main cylinder second end (320) and on the surface of the main cylinder (300), wherein a plurality of main cylinder bracket attachment holes (345) are disposed on the main cylinder bracket (340), an elbow cylinder (700) having an elbow cylinder first end (710) and an elbow second end (720), wherein the base cylinder plate (230) attaches to a vehicle front (520) via the plurality of base cylinder plate attachment holes (235), the base cylinder second end (220) inserts through the elbow cylinder first end (710), the main cylinder first end (310) inserts through the elbow cylinder second end (720), wherein the main cylinder first end (310) is secured to the elbow cylinder second end (720) via compression fit, the base cylinder second end (220) is secured to the elbow cylinder first end (710) via compression fit, the main cylinder (300) is secured to a vehicle front (520) via the plurality of main cylinder bracket attachment holes (345), an adaptor ring (400) having a bigger diameter than the main cylinder first end (310) inserts through the main cylinder second end (320), and an external device (600) inserts through the main cylinder second end (320), wherein the external device (600) rests on the adaptor ring (400) and the main cylinder insert (330) secures the external device (600) to the main cylinder (300), wherein the height of the external device (600) is adjustable via the adaptor ring (400).

* * * * *